No. 855,938. PATENTED JUNE 4, 1907.
S. CONCANNON.
CAR FENDER.
APPLICATION FILED JAN. 29, 1907.
2 SHEETS—SHEET 1.
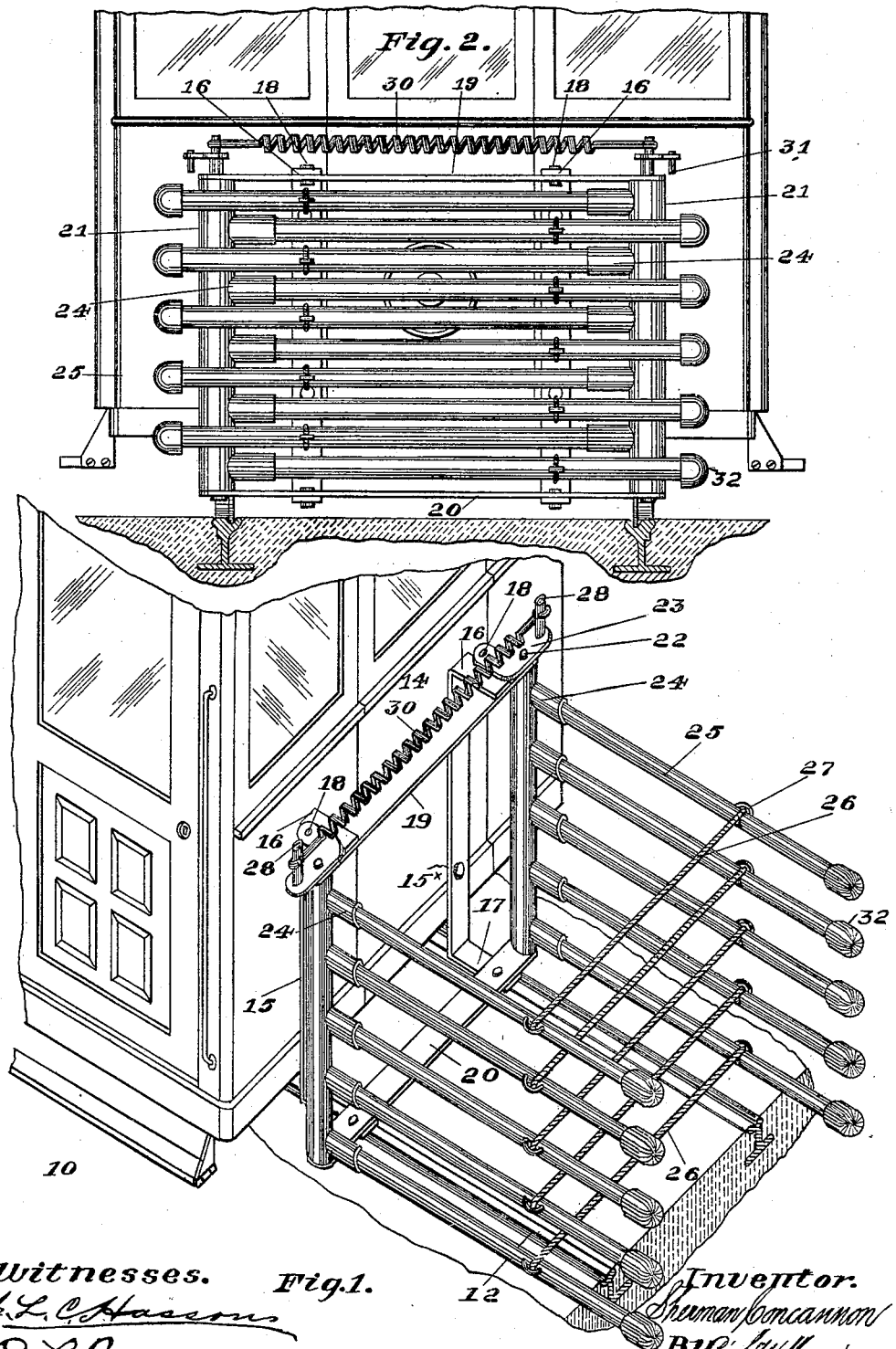

No. 855,938. PATENTED JUNE 4, 1907.
S. CONCANNON.
CAR FENDER.
APPLICATION FILED JAN. 29, 1907.

2 SHEETS—SHEET 2.

Witnesses.  Inventor.
Sherman Concannon
By Richd H Manning
Attorney.

UNITED STATES PATENT OFFICE.

SHERMAN CONCANNON, OF LENEXA, KANSAS, ASSIGNOR OF ONE-HALF TO EPHRAIM C. SOOY, OF KANSAS CITY, MISSOURI.

CAR-FENDER.

No. 855,938.  Specification of Letters Patent.  Patented June 4, 1907.

Application filed January 29, 1907. Serial No. 354,713.

*To all whom it may concern:*

Be it known that I, SHERMAN CONCANNON, a citizen of the United States of America, residing at Lenexa, in the county of Johnson and State of Kansas, have invented certain new and useful Improvements in Car-Fenders; and I do hereby declare that the following is a full, clear, and exact description of the invention, such as will enable others to make and use the same, reference being had to the accompanying, drawings, forming a part of this specification.

The object of the invention is first—to enable the car fender to obtain an efficient hold of the body of the person in the path of a moving car when brought forcibly into contact with the fender. Second—to remove the obstruction upon the track with minimum degree of force and third—to enable the parts of the fender to be folded compactly when not in use.

The invention consists in the novel construction and combination of parts such as will be first fully described and then specifically pointed out in the claims.

Figures 4, 5:
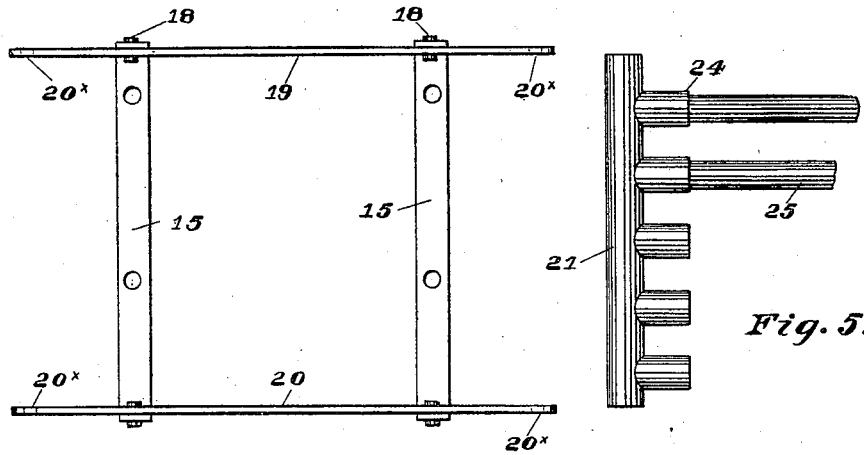
Figures 6, 7:
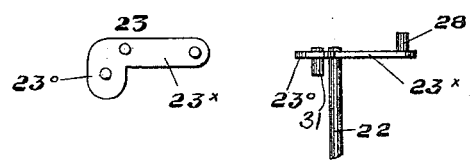
Figure 3:
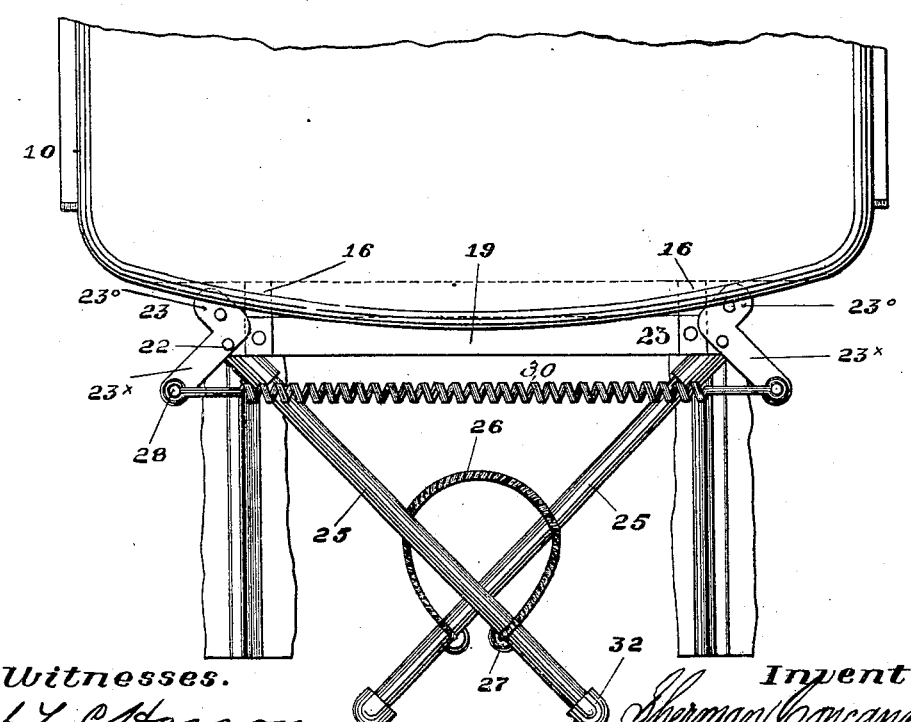

In the drawings Figure 1 is a view in perspective of the novel car fender, the parts being shown in an open or forwardly extended position for use, the fender being shown connected with the forward end portion of a car mounted upon the track rails. Fig. 2 is a front view of the fender and the lower forward end portion of the car showing the parts of the fender in a closed position when the fender is not in use. Fig. 3 is a plan view of the fender and the forward end portion of the car showing the position of the parts of the fender when the body of the person is within its grasp. Fig. 4 is a detail front view enlarged of the brackets secured to the end of the car showing the transverse fender supporting bars. Fig. 5 is a detail side view of one of the rotary fender supporting posts enlarged showing the lateral sockets for the arms of the fender. Fig. 6 is a detail view of a portion of one of the pivotal rods for the posts in the transverse bars showing one of the fender operating eccentrically pivoted crank plates. Fig. 7 is a detail plan view of one of the crank plates.

Similar numerals of reference indicate corresponding parts in all the figures of the drawings.

Referring to the drawings 10 indicates a street railway car mounted upon the track rails 12. Upon the end 14 of the car are secured by the bolts $15^\times$ the fender supporting brackets consisting of separate flat plates 15 arranged in vertical positions a short distance inwardly from the lines of the respective sides of the car. The upper ends of the plates extend the requisite height and short portions 16 of said ends are bent at right angles and extended forwardly a short distance. The lower ends of plates 15 extend downwardly a short distance below the line of the under surface of the body of the car or as far as permissible to enable the car to pass over grades of varying inclinations. Portions 17 of the lower ends of plates 15 are bent at right angles and extended forwardly a corresponding distance to the portions 16 of said plates.

With the outer ends and lower surfaces of the bent extensions 16 of plates 15 is connected rigidly by the rivets 18 a transverse bar 19, the respective ends of which bar extend a short distance beyond the vertical lines of the outer surfaces of said plates 15. With the outer ends and upper surfaces of the bent portions 17 of plate 15 is connected rigidly a transverse plate 20 the length of which plate corresponds with plate 19 and the ends of which plate 20 are in a vertical line with the ends of said plate 19.

21 indicate the rotary posts supporting the arms of the fender. As shown these posts are cylindrical in cross section the lower ends being mounted upon the upper surfaces and ends of plate 20 and the upper ends of said posts coming into contact with the lower surfaces of the respective ends of the plate 19. In the ends of the respective plates 19 and 20 are perforations $20^\wedge$, see Fig. 4. Through the perforations $20^\times$ in the respective ends of the plates 19 and 20 and longitudinally through the respective posts 21 are extended pivot rods 22 secured firmly within the posts so as to rotate therewith. The upper ends of the rods 22 extend a short distance in height above the line of the upper surfaces of the plate 19 and with said ends are secured rigidly the eccentric crank plates or levers 23. The arms $23^\times$ of these plates or levers extend at right angles to and are considerably longer than the arms $23^\circ$ the pivot rods 22 being connected eccentrically with said portions or arms $23^\times$ of the levers adjacent to their inner surfaces and at a point a short distance outwardly from the intersecting lines of the angles formed by said portions 23× and 23° of the plates so that the connecting points of the eccentrically mounted plates with the pivot rods are removed from a center of oscillation.

With the posts 21 are connected rigidly the sockets 24 which extend laterally from the outer surface of said posts and in vertical series and are spaced at equal distances apart in the longitudinal direction of the posts. The sockets are arranged in position upon one post 21 so that the socket highest in position upon said post will be adjacent to the upper end of said post and the lowest in position upon the other post adjacent to the lower ends of said post so that one series of sockets are in alternate positions to the sockets in the other series so as to fold together as seen in Fig. 2. In the sockets 24 on the respective posts 21 are inserted snugly the inner ends of the bars or arms 25 of the fender, the outer ends of which bars extend outwardly a considerable distance. 26 indicates the fender cords or ropes the length of which ropes permits the arms 25 of the fender to be extended directly forward when the fender arms are in an open position. The series of ropes at one end are connected respectively with the bar 25 upon one of the pivot posts 21 at a point a short distance inwardly from their outer ends and then extended to and connected at their other ends with the respective bars in the series of bars 25 upon the other pivot post at a like point, thus presenting when the arms of the fender are in an open position a series of horizontal ropes or strands under tension and in the same vertical line with each other. The ends of the ropes are wound around the arms and tied in a knot. In order to prevent movement of the ends of the ropes upon the arms 25 staples 27 are connected with the outer surfaces of the respective bars and the staples extended upon each side of the portion of the ropes wound upon said arm.

Upon the upper surfaces and outer ends of the portions 23× of the crank plates 23 are fixed pins 28.

30 indicates a spiral spring of considerable length one end of the spring being secured to the upper end of the pin 28 upon one crank lever and the other end of the spring extended to and connected with the upper end of the pin 28 upon the other crank plate lever the tension of which spring being such as to control the outward movement of the fender arms 25 and retain said arms in position when forwardly extended.

Upon the lower surfaces of the portions 23° of the eccentric crank plates and the outer ends of said portions are short downwardly extended pins 31 which come into contact with the outer surfaces of the outwardly bent portions 16 of the plates or brackets 15 when the arms 25 are extended outwardly in position and stops the movement of the eccentric crank plates.

Upon the outer ends of the arms 25 are fender air cushions 32. These cushions are hollow spherical balls made preferably from gutta percha which fit over the ends of the bars 25 and are secured thereto in any suitable manner.

In operation the fender arms 25 are extended in a forward position when the car is in readiness for movement. In this position of the arms 25 of the fender the portions 23× of the eccentrically mounted crank plate 23 are in outwardly and oppositely extended positions and stopped by pins 31 and the position of the coiled spring 30 is slightly in rear of a vertical line extending through the pivot rods 21 and exerting a constant power to retain the arms 25 in their outward position a tension being also imparted to the fender cords or ropes 21.

In the movement of the car a person directly upon the track and unable to avoid collision with the car will be struck with considerable force by the fender ropes 26 and the resistance offered by the body of the person causes the arms 25 to move inwardly and embraces the body. The action draws upon spring 30 the portions 23× of the crank arms moving forwardly past the eccentric points of the crank arms or levers and in the indrawing of the ends of the arms a loop is formed extending around the body of the person, the end of the arms clasping each other as seen in Fig. 3 and holding within the loop and the clasped portion of the arms the body until the movement of the car is arrested and the arms again opened and the body released. In the contact of the ropes with the body the ropes are in position for the person in collision to grasp and are absent in the ordinary street car fender. While the seizure of the body in the collision by the fender ropes 26 and arms is forcible the security of the grasp will prevent the person falling beneath the car and if caught in a bent position the certainty of the body being grasped is apparent. In colliding with a body of a person in the scope of the cushions 32 upon the ends of the supporting bars 25, when the position of the body of the person is outside of the lines of the track rails the tendency of the impact is to throw the person away from the track rails and contact of the body with the outer surfaces of the bars 25 will be resisted by said bars.. When the body of a person is caught and held within the loop formed by the cords 26 it is obvious that the bars 25 are within reach of the hands in order to raise the body from the track after the collision. When the car is stopped to release the body held within the loop of the ropes 26 the arms are moved outwardly thus extending the ropes. When not in use the series of bars 25 upon one post 21 fold within the series of bars upon the other post and in parallel planes with each other and transversely to the forward end of the car thus being compact and occupying a small space upon the end of the car. The arms 25 when broken are readily replaced in the sockets 24. The invention is applicable to automobiles and any other form of power propelled vehicles and may be applied in a reverse position if desired with the bars in vertical planes.

Having fully described my invention what I now claim as new and desire to secure by Letters Patent is 1. In a car fender a series of fender cords or ropes and means for supporting the ends of said ropes forwardly in position upon the end of the car.

2. In a car fender a series of fender cords or ropes and outwardly extended supporting devices in series upon the ends of the car supporting the ends of said fender ropes.

3. In a car fender having upwardly and forwardly extended supporting posts the combination of fender ropes spanning the space between said parts of the fender.

4. In a car fender the combination with folding members of said fender of fender ropes connected with said members.

5. In a car fender the combination with the yielding arms of loops forming connecting devices connected with said arms.

6. In a car fender the combination with the pivoted supports and arms upon said supports fender ropes connected with said arms and spring actuated controlling means for controlling the movements of said pivoted supports.

7. In a car fender the combination with forwardly extended fender arms and pivoted supports for said arms of contracting springs adapted to draw the ends of said arms apart.

8. In a car fender the combination with separate pivoted supports and folding fender arms upon the respective supports of fender ropes or cords connected at the ends with said folding arms and means acting automatically to draw the said arms toward each other into a folding position.

9. In a car fender a series of forwardly extended arms upon the forward end of the car air cushions upon the ends of said arms.

10. In a car fender the combination with pivoted supporting posts and fender arms connected with said posts and resilient fender devices upon the forward ends of said arms.

11. In a car fender the combination with separate pivoted supporting posts upon the end of the car and with forwardly extended arms upon said posts, means acting to draw the arms toward each other and fender ropes connected at the ends with said arms.

12. In a car fender the combination with pivoted supporting posts and sockets upon said posts of fender arms within said sockets.

13. A car fender comprising separate supporting brackets transverse upper and lower supporting bars upon said brackets posts pivotally connected with the ends of the respective upper and lower transverse bars, fender arms connected with and extending outwardly from said posts eccentric crank plates connected with the pivots to said posts, a coiled spring connected at its ends to the respective plates and means for stopping the movement of said plates in one direction of rotation.

14. A car fender comprising separate brackets upper and lower transverse plates supported thereby posts at the ends of said plates pivotally connected folding fender arms connected with said posts and extending outwardly in position fender ropes connected at the ends with the arms on the separate posts crank plates connected eccentrically with said pivots on said posts pins upon the upper surfaces of said eccentric plates coiled spring connected at its ends to the respective pins on said eccentric crank plates and stop pins upon the lower surfaces of said plates adapted to come into contact with the said brackets when the arms are in an open position.

In testimony whereof I have signed my name to this specification in the presence of two subscribing witnesses this 21st day of January A. D. 1907.

SHERMAN CONCANNON.

Witnesses:
 WM. WALTER BRADY,
 JANE A. LOE.